United States Patent
Lee et al.

(10) Patent No.: US 10,611,574 B2
(45) Date of Patent: Apr. 7, 2020

(54) BRAKE ASSEMBLY FOR CONVEYOR SYSTEM

(71) Applicant: Nissan North America, Inc., Franklin, TN (US)

(72) Inventors: Sang Lee, Highland, IN (US); Michael Davis, Canton, MS (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 16/049,395

(22) Filed: Jul. 30, 2018

(65) Prior Publication Data

US 2020/0031582 A1 Jan. 30, 2020

(51) Int. Cl.
| | |
|---|---|
| *B65G 17/30* | (2006.01) |
| *F16D 59/00* | (2006.01) |
| *B61B 10/02* | (2006.01) |
| *B61K 7/06* | (2006.01) |
| *B65G 17/20* | (2006.01) |
| *B65G 9/00* | (2006.01) |

(52) U.S. Cl.
CPC ............ *B65G 17/30* (2013.01); *B61B 10/025* (2013.01); *B61K 7/06* (2013.01); *B65G 9/006* (2013.01); *B65G 17/20* (2013.01); *F16D 59/00* (2013.01); *B65G 2205/06* (2013.01)

(58) Field of Classification Search
CPC .... B65G 17/30; B65G 17/20; B65G 2205/06; B65G 9/006; B61B 10/025; B61K 7/06; B61K 7/08; F16D 9/00; F16D 59/02
See application file for complete search history.

(56) References Cited

U.S. PATENT DOCUMENTS

| | | | | |
|---|---|---|---|---|
| 3,559,585 | A * | 2/1971 | Lempio | B61B 10/025 104/172.4 |
| 3,705,554 | A * | 12/1972 | Aksamit | B61B 10/025 104/250 |
| 4,646,650 | A * | 3/1987 | Kondo | B61B 10/025 104/172.3 |
| 4,790,247 | A | 12/1988 | Summa | |
| 4,850,281 | A | 7/1989 | Kurek | |
| 4,901,648 | A * | 2/1990 | Moore | B60T 7/126 104/250 |
| 5,388,525 | A * | 2/1995 | Bodkin | B61K 7/02 104/252 |
| 5,570,639 | A * | 11/1996 | Hooper | B61B 10/02 104/172.4 |
| 5,606,915 | A * | 3/1997 | Harris | B61B 10/02 104/172.4 |
| 8,973,506 | B2 * | 3/2015 | Yamashita | B61K 7/16 104/249 |

* cited by examiner

*Primary Examiner* — Mark A Deuble
(74) *Attorney, Agent, or Firm* — Global IP Counselors, LLP

(57) ABSTRACT

A brake assembly for a conveyor system includes a first bracket, a second bracket and a brake member. The first bracket is configured to receive a channel of the conveyor system. The second bracket is spaced from the first bracket and configured to receive the channel of the conveyor system. The brake member is pivotally connected to the second bracket. A pivot axis about which the brake member is configured to pivot is disposed outwardly of the second bracket. A biasing member is configured to bias the brake member inwardly.

20 Claims, 7 Drawing Sheets

BRAKE ASSEMBLY FOR CONVEYOR SYSTEM

BACKGROUND

Field of the Invention

The present invention generally relates to a brake assembly for a conveyor system. More specifically, the present invention relates to a brake assembly for a conveyor system in which a pivot pin and a brake member of the brake assembly are easily accessible.

Background Information

A conveyor system moves an item from one location to another. A power and free conveyor system, for example, allows the item to be moved when engaged to the power portion of the conveyor system, and allows the item to remain stationary when disengaged, that is, free, from the power portion of the conveyor system. A trolley is typically risen to transport the item, and is engaged and disengaged from the power portion of the conveyor system as necessary.

Brake assemblies are disposed throughout the conveyor system to facilitate controlling movement of the trolley through the conveyor system. A brake member is pivotally mounted by a pivot pin to a bracket to engage the trolley. However, the pivot pin and the brake member are disposed in locations that are not easily accessible when maintenance or repair of the brake assembly is required. Additionally, when the pivot pin breaks, the brake member can interfere with movement of the trolley, thereby disrupting operation of the conveyor system.

SUMMARY

One object of the present invention is to provide a brake assembly for a conveyor system in which a pivot pin and a brake member of the brake assembly are easily accessible to facilitate maintenance and repair of the brake assembly.

In view of the state of the known technology, one aspect of the present disclosure is to provide a brake assembly for a conveyor system. The brake assembly includes a first bracket, a second bracket and a brake member. The first bracket is configured to receive a channel of the conveyor system. The second bracket is spaced from the first bracket and configured to receive the channel of the conveyor system. The brake member is pivotally connected to the second bracket. A pivot axis about which the brake member is configured to pivot is disposed outwardly of the second bracket. A biasing member is configured to bias the brake member inwardly.

Another aspect of the present invention includes a conveyor system having an upper channel, and first and second lower channels. A chain is movably connected to the upper channel. The second lower channel is disposed opposite the first lower channel, and a first brake assembly is connected to the first lower channel. The first brake assembly includes a first bracket connected to the first lower channel. A second bracket is connected to the first lower channel. The second bracket is spaced from the first bracket in a direction of travel of the chain. A first brake member is pivotally connected to the second bracket. A first pivot axis about which the first brake member is configured to pivot is disposed outwardly of the second bracket. A first biasing member is configured to bias the first brake member toward the second lower channel.

Also other objects, features, aspects and advantages of the disclosed the brake assembly for the conveyor system will become apparent to those skilled in the art from the following detailed description, which, taken in conjunction with the annexed drawings, discloses exemplary embodiments of the electrostatic discharge assembly.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
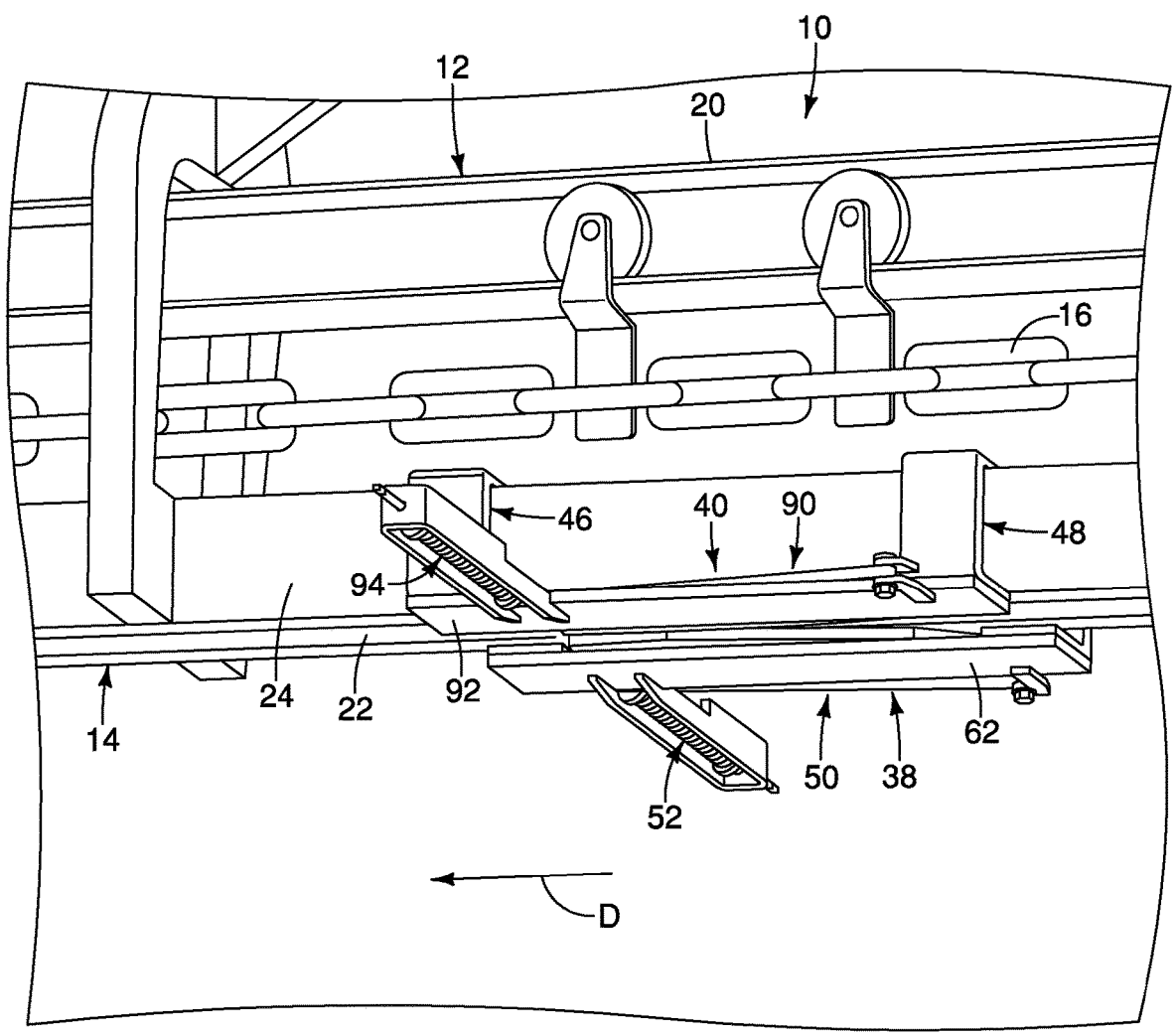
FIG. 1 is a perspective view of a conveyor system in accordance with an exemplary embodiment of the present invention.

Referring initially to FIG. 1, an overhead conveyor system 10 is illustrated in accordance with an exemplary embodiment of the present invention. The conveyor system 10 includes a power rail 12 and a free rail 14. A chain 16 is movably connected to the power rail 16 to move in a direction D. A trolley 18 (FIGS. 11 and 12) is movably connected to the free rail 14. A retractable dog (not shown) of the trolley 18 is selectively engaged with the chain 16. When the retractable dog engages the chain 16, the trolley 18 moves with the chain 16 (i.e., a power state). When the retractable dog is not engaged with the chain 16, the trolley 18 does not move (i.e., a free state). The conveyor system 10 illustrated in FIG. 1 is commonly referred to as a power and free conveyor system. Although the description refers to a power and free conveyor system, the brake assembly in accordance with exemplary embodiments of the present invention is not so limited and can be used with any suitable conveyor system.

The power rail 12 includes an upper channel 20, as shown in FIG. 1. The chain 16 is connected to the upper channel 20 of the power rail 12 such that the chain 16 moves continuously in the direction D when the conveyor system 10 is in operation. The power rail 12 can alternatively be an H beam or an I beam. Alternatively, the power rail 12 can include a pair of upper channels that support the chain 16 for continuous movement.

The free rail 14 includes a first lower channel 22 and a second lower channel 24, as shown in FIGS. 1-4. The second lower channel 24 is disposed opposite the first lower channel 22. The first and second lower channels 22 and 24 of the free rail 14 movably support the trolley 18 (FIGS. 11 and 12) when the trolley 18 is engaged with the chain 16. When the trolley 18 is not engaged with the chain 16, the first and second lower channels 22 and 24 of the free rail 14 support the trolley in the free, or stationary, state.

The first lower channel 22 has a web member 26 connecting an upper flange 28 and a lower flange 30. The upper and lower flanges 28 and 30 extend substantially perpendicularly in the same direction from opposite ends of the web member 26.

The second lower channel 24 has a web member 32 connecting an upper flange 34 and a lower flange 36. The upper and lower flanges 34 and 36 extend substantially perpendicularly in the same direction from opposite ends of the web member 32. The second lower channel 24 is preferably substantially identical to the first lower channel 22.

In the conveyor system 10, the first and second lower channels 22 and 24 are disposed such that the upper flanges 28 and 34 extend toward one another and the lower flanges 30 and 36 extend toward one another, thereby forming gaps G1 and G2 between free ends of each of the upper and lower flanges, respectively. The gaps G1 and G2 allow the trolley to move between the first and second lower channels 22 and 24 of the free rail 14. The gaps G1 and G2 are preferably substantially the same distance.

Figure 2:
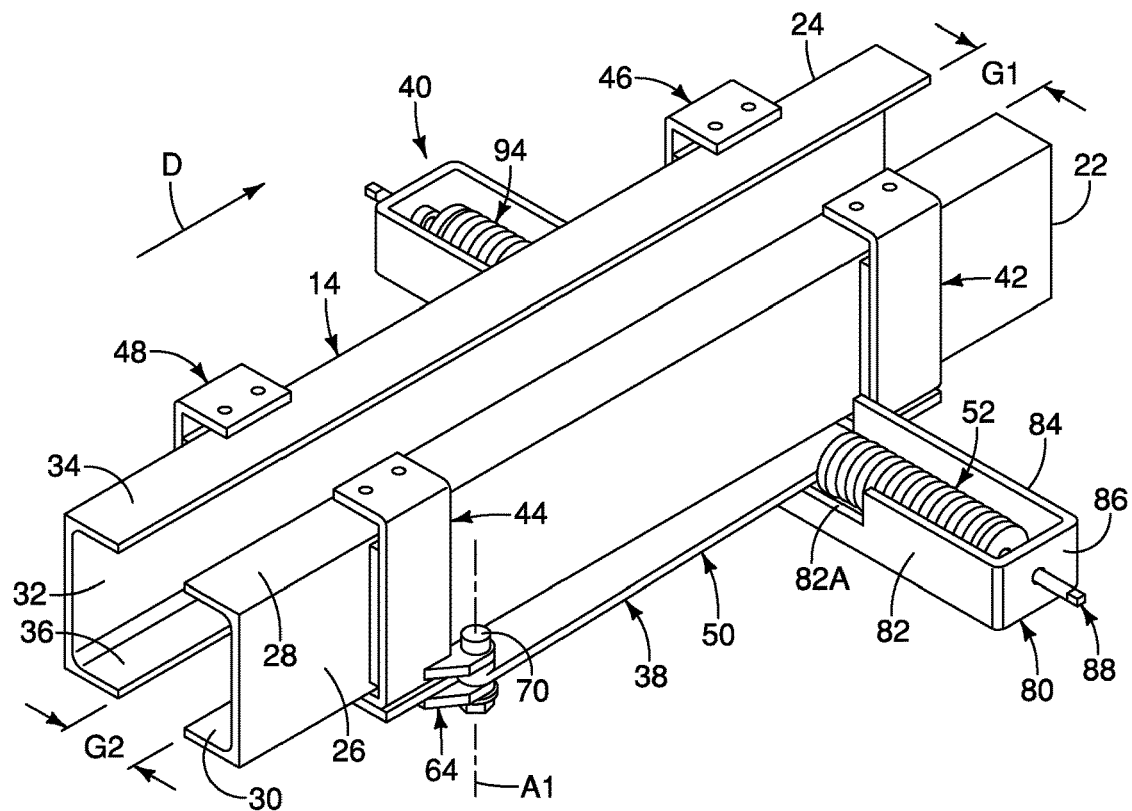
FIG. 2 is an upper perspective view of a brake assembly connected to each of first and second lower channels in which other components of the conveyor system are removed for clarity.
Figure 3:
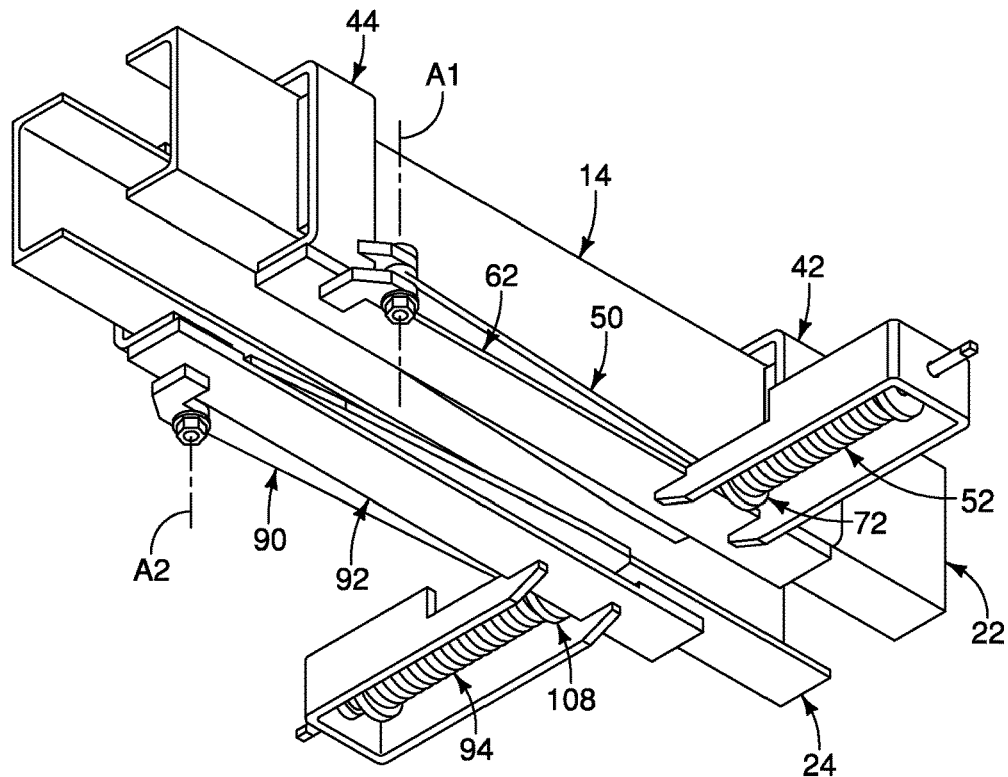
FIG. 3 is an outer, lower perspective view of the first and second brake assemblies connected to the first and second lower channels of FIG. 2.
Figure 4:
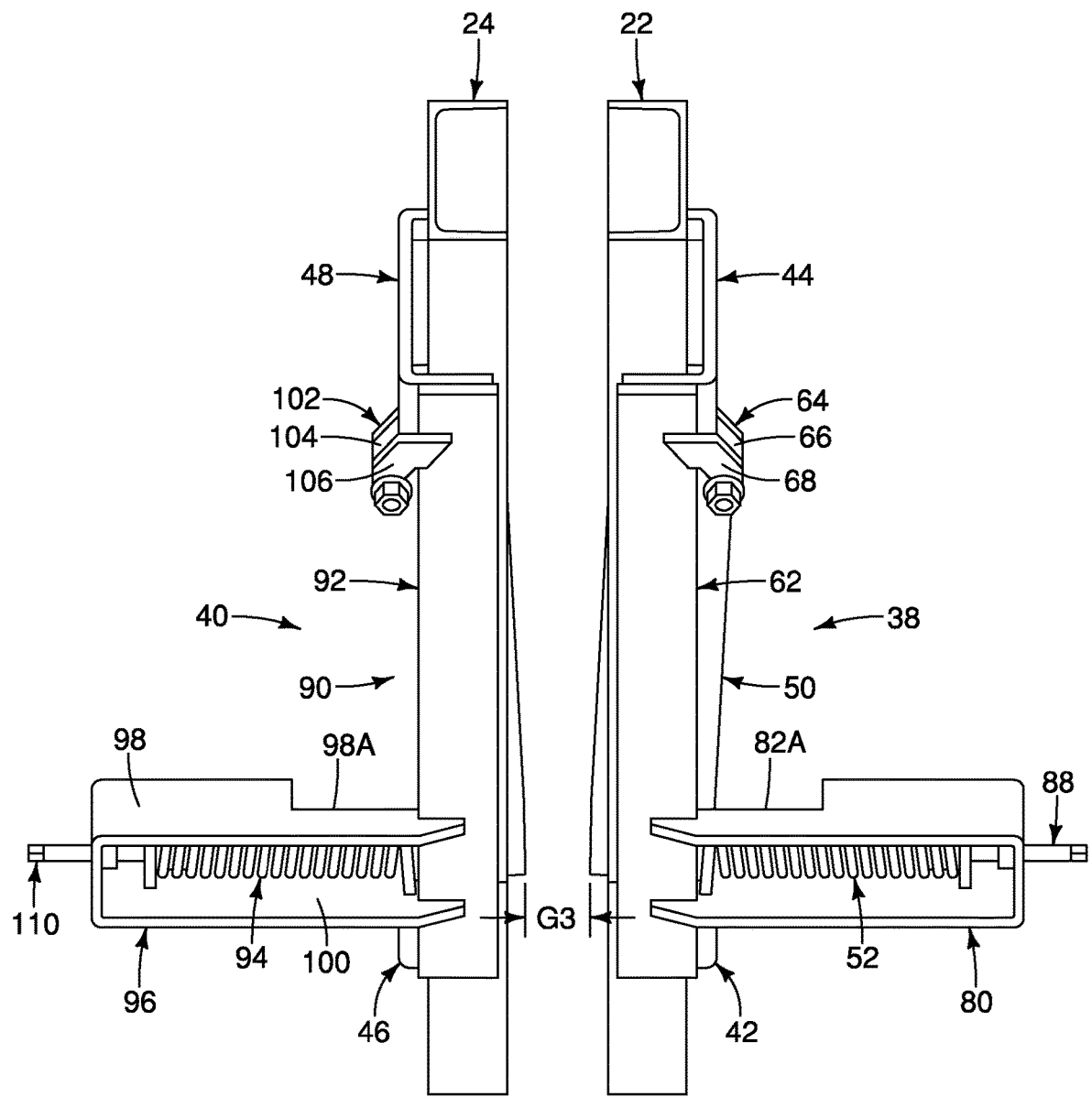
FIG. 4 is a central, lower perspective view of the first and second brake assemblies connected to the first and second lower channels of FIG. 2.
Figure 11:
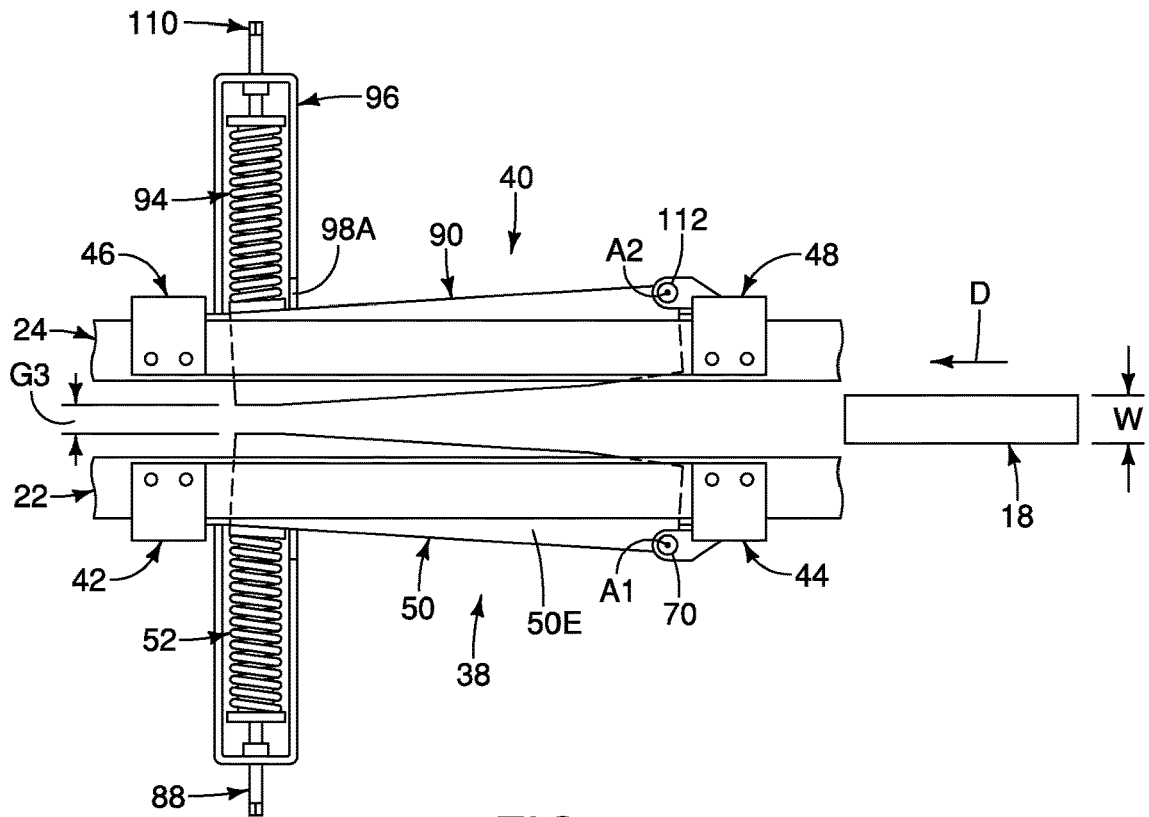
FIG. 11 is a top plan view of the first and second brake assemblies connected to the first and second lower channels of FIG. 2 prior to the first and second brake assemblies being engaged by a trolley.
Figure 12:
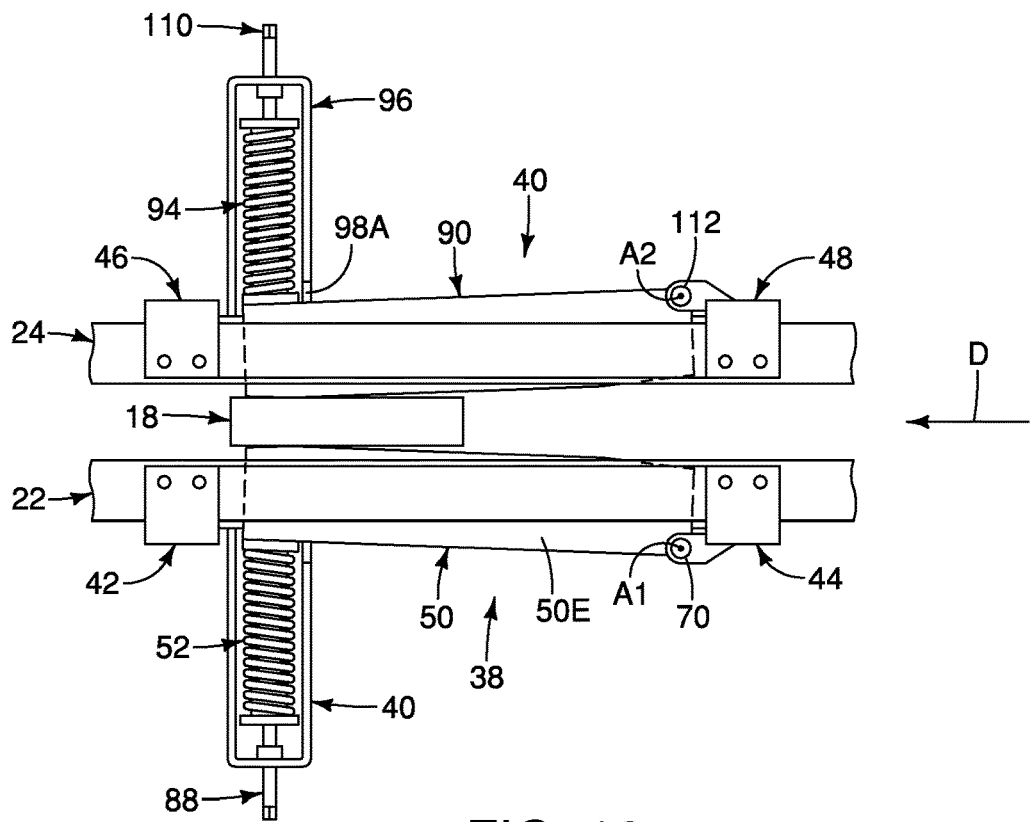
FIG. 12 is a top plan view of the first and second brake assemblies of FIG. 11 in which the trolley engages the first and second brake assemblies.

A first brake assembly 38 is connected to the first lower channel 22, as shown in FIGS. 2-4. A second brake assembly 40 is connected to the second lower channel 24. The second brake assembly 40 is preferably disposed directly opposite the first brake assembly 38 to facilitate braking a trolley 18 passing therebetween, as shown in FIGS. 11 and 12.

The first brake assembly 38 includes a first bracket 42 and a second bracket 44 connected to the first lower channel 22. the second bracket 44 is spaced from the first bracket 42 in a direction of travel of the chain (indicated by the directional arrow D in FIG. 2). The second brake assembly 40 includes a third bracket 46 and a fourth bracket 48 connected to the second lower channel 24. The fourth bracket 48 is spaced from the third bracket 46 in the direction of travel of the chain. The first bracket 42 is preferably disposed directly opposite the third bracket 46, and the second bracket 44 is preferably disposed directly opposite the fourth bracket 48.

The first brake assembly 38, as shown in FIGS. 5-9, includes the first and second brackets 42 and 44, a brake member 50 and a biasing member 52. The first and second brackets 42 and 44 are configured to receive a channel of the conveyor system 10, such as the first lower channel 22 (FIGS. 1-4). The first bracket 42 is preferably substantially C-shaped, and has an upper leg 42A and a lower leg 42B extending from opposite ends of a bracket leg 42C. A first spacer 54 is preferably disposed on an inner surface of the bracket leg 42C. A second spacer 56 is preferably disposed on an inner surface of the lower bracket leg 42B.

The second bracket 44 is preferably substantially similar to the first bracket 42, as shown in FIGS. 5-9. The second bracket 44 is preferably substantially C-shaped, and has an upper leg 44A and a lower leg 44B extending from opposite ends of a bracket leg 44C. A first spacer 58 is preferably disposed on an inner surface of the bracket leg 44C. A second spacer 60 is preferably disposed on an inner surface of the lower bracket leg 44B.

As shown in FIGS. 5-9, a support member 62 extends between the first bracket 42 and the second bracket 44. The support member 62 is connected to outer surfaces of the lower legs 42B and 44B of the first and second brackets 42 and 44, respectively. The support member 62 is preferably rectangular, although the support member may be any suitable shape. The support member 62 spaces the first bracket 42 and the second bracket 44 in the travel direction D of the chain 16 (FIG. 1). The support member 62 is preferably made of steel.

A pivot hub 64 includes an upper hub member 66 and a lower hub member 68, as shown in FIGS. 5-9. The upper hub member 66 is rigidly connected to the outer surface of the bracket leg 44C of the second bracket 44. The lower hub member 68 is rigidly connected to a lower surface 62A of the support member 62. Fastener openings 66A and 68A disposed in the upper and lower hub members 66 and 68 are aligned to receive a fastener, or pivot pin, 70.

Figure 10:
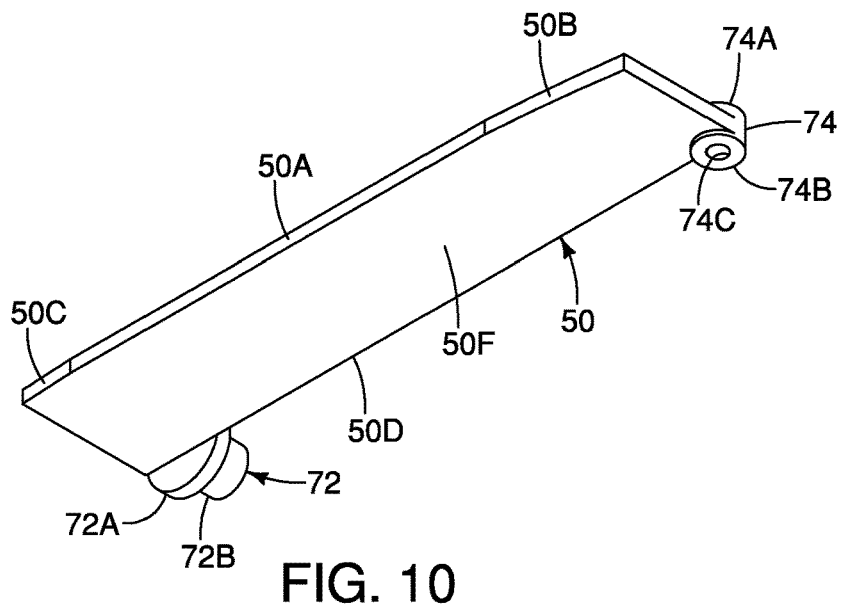
FIG. 10 is a perspective view of a first brake member of the first brake assembly of FIG. 5.

A brake member 50 is pivotally connected to the second bracket 44, as shown in FIGS. 5-9 and 10. The brake member 50 preferably has a substantially rectangular shape, as shown in FIGS. 10-12. A trolley engaging edge 50A preferably has rounded portions 50B and 50C proximal each end to facilitate engaging the trolley 18. An edge 50D opposite the trolley engaging edge 50A is preferably linear. The brake member 50 is preferably made of steel.

A projection 72 extends outwardly proximal a first end of the brake member 50. The projection 72 preferably extends perpendicularly from the edge 50D. The projection 72 includes a flange member 72A and a cylindrical member 72B extending outwardly from a face of the flange member 72A. A width of the cylindrical member 72B is less than a width of the flange member 72A, as shown in FIG. 10. The projection 72 is preferably integrally formed with the brake member 50 as a one-piece member.

Figure 8:
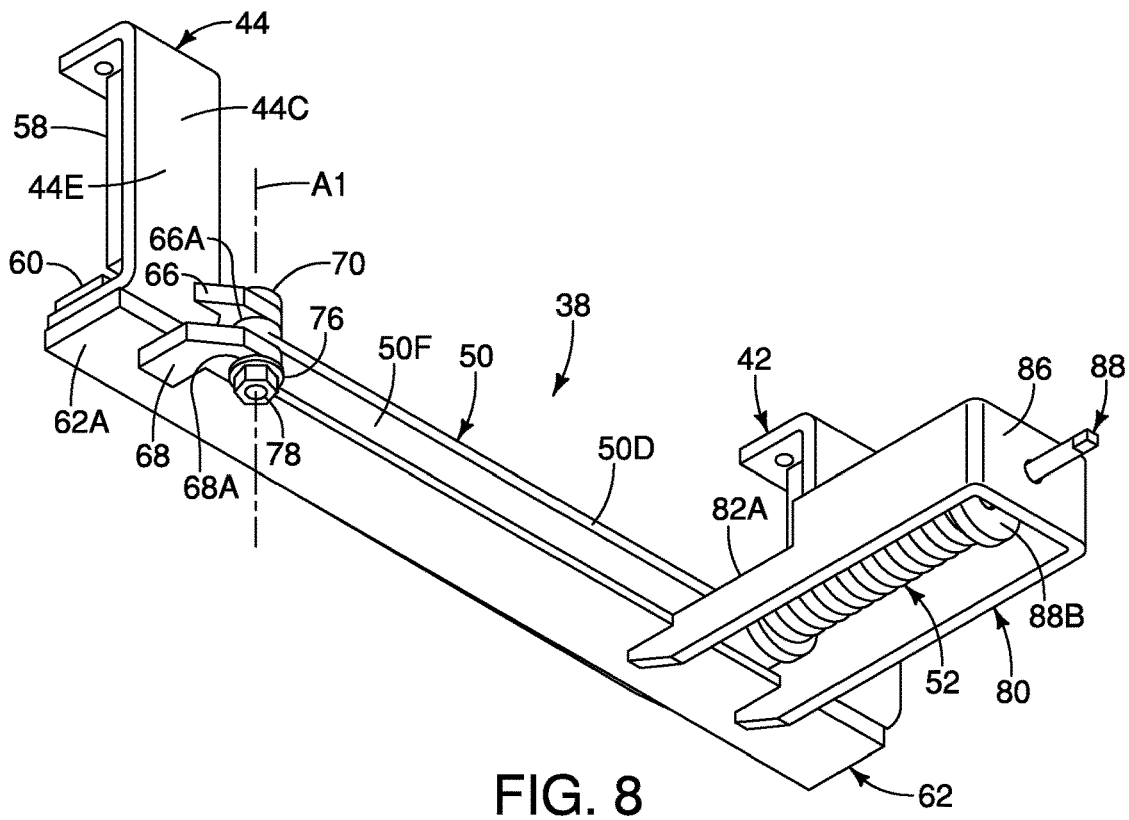
FIG. 8 is an outer, lower perspective view of the first brake assembly of FIG. 5.
Figure 9:
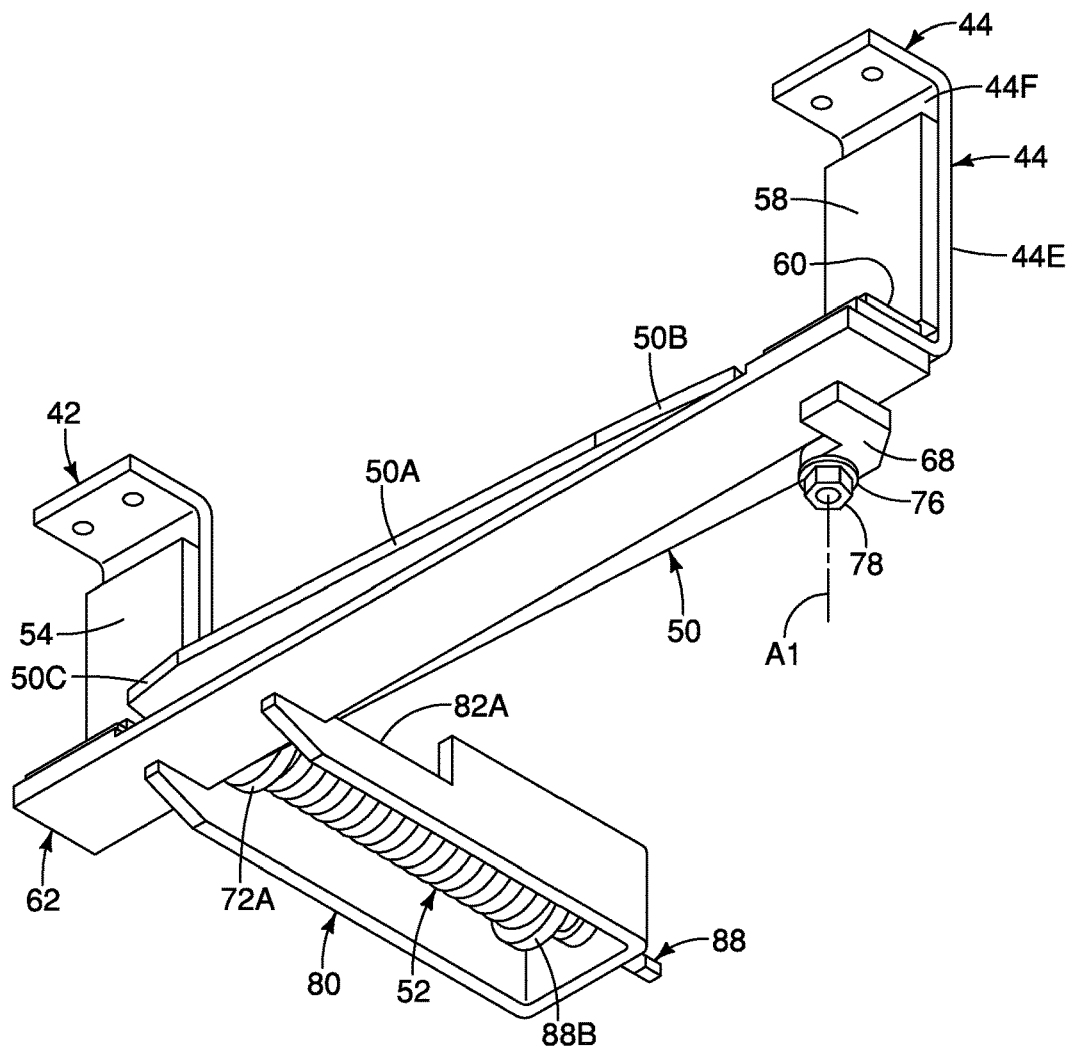
FIG. 9 is an inner, lower perspective view of the first brake assembly of FIG. 5.

A boss 74 is disposed at a first end of the brake member 50, as shown in FIG. 10. Preferably, the boss 74 has an upper surface 74A disposed above an upper surface 50E of the brake member 50 and a lower surface 74B disposed lower than a lower surface 50F of the brake member 50, as shown in FIGS. 8 and 10, thereby providing a strengthened pivot point for the brake member 50 and facilitating pivotal movement of the brake member 50 between the upper and lower huh members 66 and 68. A fastener opening 74C extends from the upper surface 74A of the boss 74 to the lower surface 74B of the boss 74. The fastener opening 74C extends in a direction substantially perpendicular to the direction in which the projection 72 extends. Alternatively, the boss has a thickness substantially equal to that of the brake member, such that the upper and lower surfaces of the boss are at the same height as the upper and lower surfaces of the brake member. The projection 72 and the boss 74 are disposed at opposite ends of the same side (that is, the edge 50D) of the brake member 50. Preferably, the boss 74 is integrally formed with the brake member 50 as a one-piece member.

The fastener 70 is inserted from an upper surface of the upper hub member 66 through the fastener opening 66A in the upper hub member 66, through the fastener opening 74C in the brake member boss 74, which is aligned with the fastener openings 66A and 68A in the upper and lower hub members 66 and 68, and through the fastener opening 68A in the lower hub member 68. A washer 76 and a nut 78 are disposed on the fastener 70, such that the washer 76 contacts a lower surface of the lower hub member 68, as shown in FIG. 8. The brake member boss 74 allows the brake member 50 to pivot about the fastener 70 and between the upper hub member 66 and the lower hub member 68. The nut 76 and washer 78 are easily removable from the pivot hub 64, such that the fastener 70 can be easily accessed and replace to maintain operation of the brake assembly 38.

Figure 5:
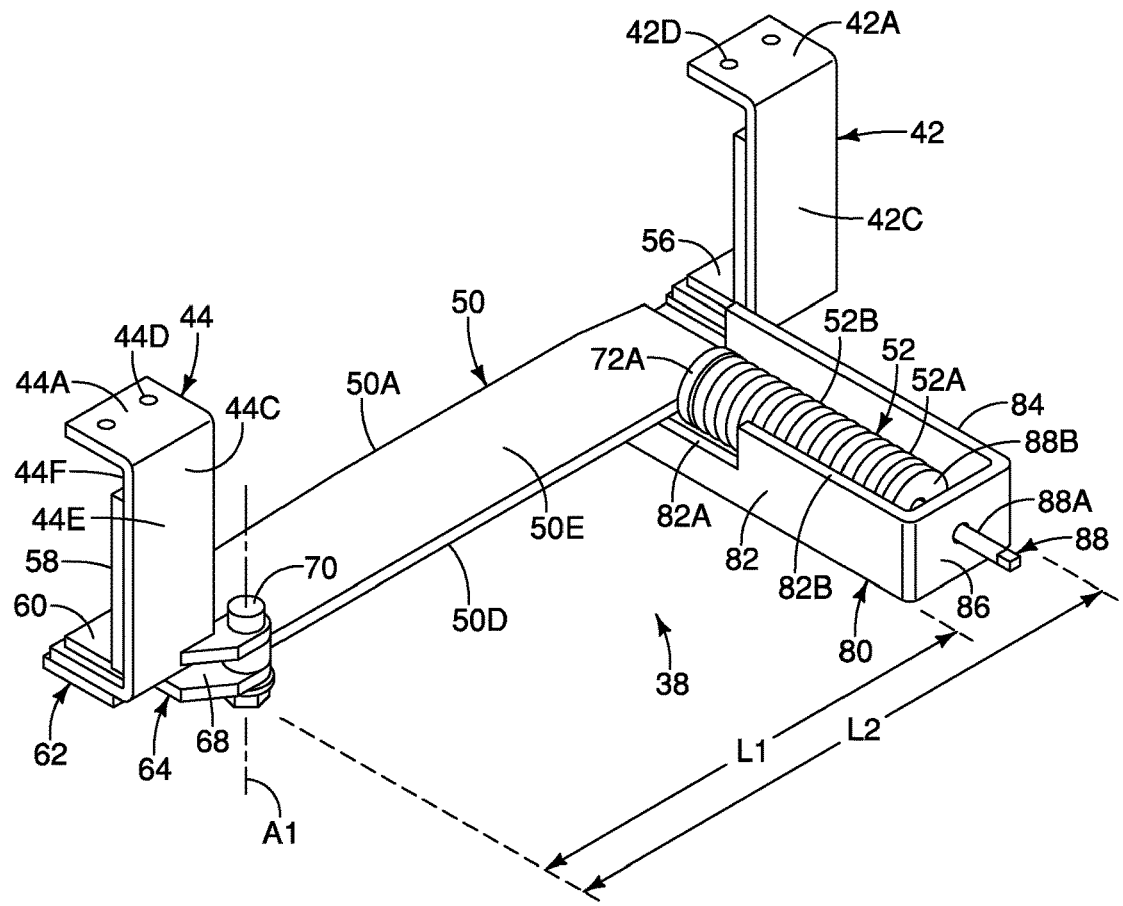
FIG. 5 is an outer perspective view of the first brake assembly of FIG. 2 removed from the first lower channels.

The brake member 50 pivots about a first pivot axis A1 passing through the fastener 70. The first pivot axis A1 is disposed outwardly of the second bracket 44, as shown in FIGS. 5-9. In other words, as shown in FIG. 5, an outer surface 44E is disposed between the first pivot axis A1 and an inner surface 44F of the bracket leg 44C of the second bracket 44. An inner surface 44F of the bracket leg 44C being the surface configured to receive the first lower channel 22. The first pivot axis A1 is preferably disposed between the first bracket 42 and the second bracket 44 in the travel direction D of the chain, as shown in FIGS. 8, 11 and 12. By providing the first pivot axis A1 outwardly of the second bracket 44, the fastener 70 is easily visible to determine the wear condition thereof, and is easily accessed for maintenance and replacement.

Figure 6:
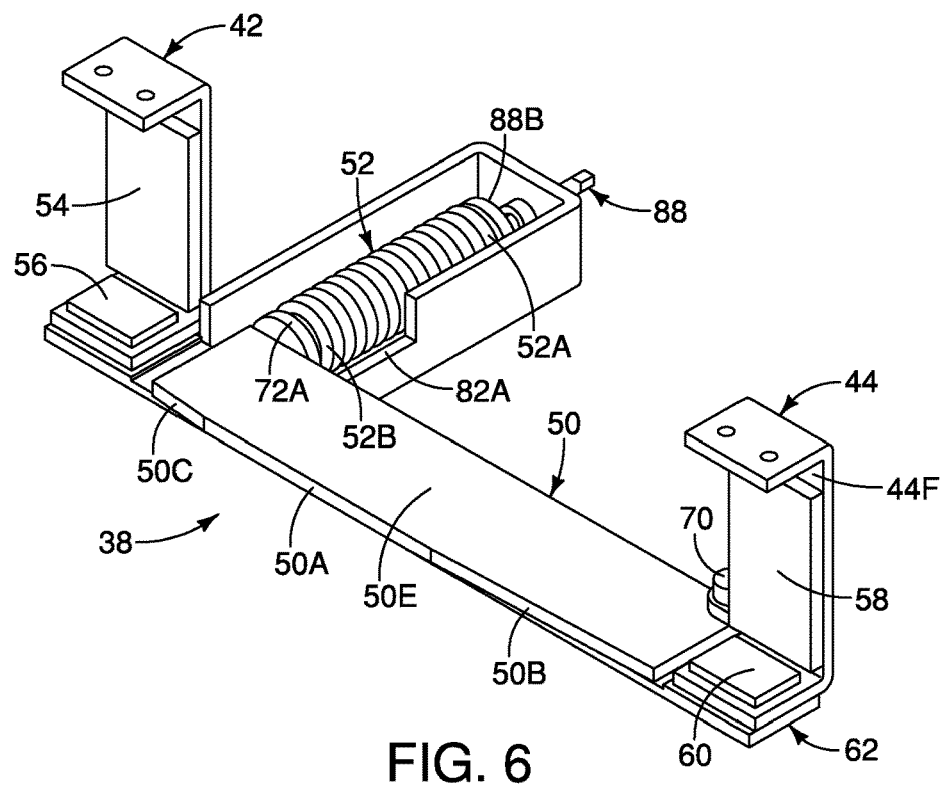
FIG. 6 is an inner perspective view from a second bracket end of the first brake assembly of FIG. 5.
Figure 7:
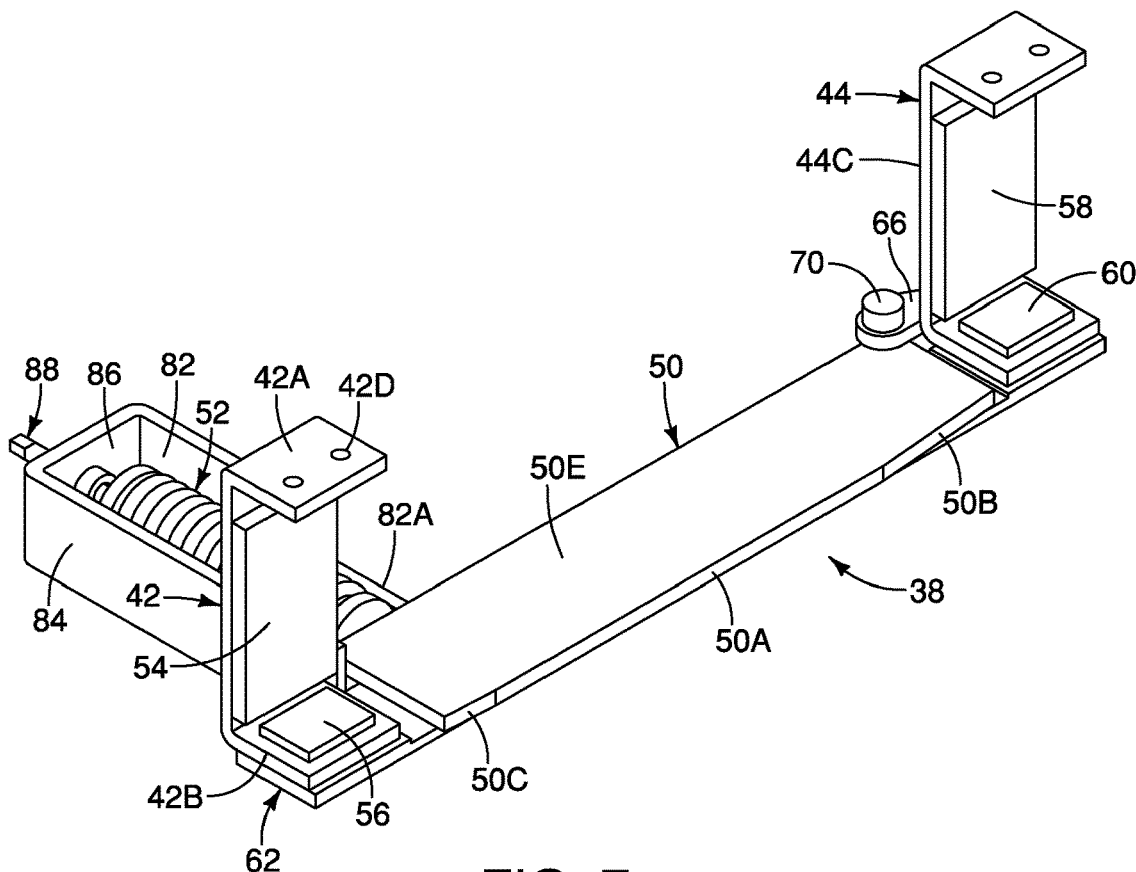
FIG. 7 is an inner perspective view from a first bracket end of the first brake assembly of FIG. 5.

The biasing member 52 is configured to bias the brake member 50 inwardly, as shown in FIGS. 5-9. In other words, the biasing member 52 is configured to bias the brake member 50 in a direction away from the first bracket 52. As shown in FIGS. 5 and 6, the biasing force pivots the brake member 50 in the counter-clockwise direction about the first pivot axis A1. The biasing member 52 is movably disposed in a housing 80 rigidly connected to the support member 62. The biasing member 52 has a first end 52A connected to the housing 80 and a second end 52B receiving the projection 72B of the brake member 72. The biasing member 52 is preferably a helical spring.

The housing 80 has a first wall 82 and a second wall 84 extending outwardly from the support member 62. The first wall 82 has a cutout portion 82A to provide access to the biasing member 52 and the brake member 50. The cutout portion 82A allows the brake member 50 and the biasing member 52 to be easily removed when necessary for maintenance or replacement. The first wall 82 of the housing 80 is disposed closer to the first pivot axis A1 then the second wall 84. In other words, a first distance L1 from the first wall 82 to the first pivot axis A1 is less than a second distance L2 from the second wall 84 to the first pivot axis A1, as shown in FIG. 5.

A third wall 86 extends between ends of the first and second walls 82 and 84 of the housing 80, as shown in FIGS. 5-9, thereby defining an interior space of the housing 80 within which the biasing member 52 is disposed. The third wall 86 is preferably disposed substantially perpendicularly to each of the first and second walls 82 and 84. A height of the second wall 84 is substantially constant from the third wall 86 to the support member 62, as shown in FIG. 5. A first portion 82B of the first wall 82 has a height larger than that of a height of the cut-out portion 82A. A first housing support 82C is disposed at a free end of the first wall 82, and a second housing support 84A is disposed at a free end of the second wall 84. The first and second housing supports 82C and 84A are rigidly connected to a lower surface 62A of the support member 62 in any suitable manner, such as by welding.

The first end 52A of the biasing member 52 receives an adjusting member 88, as shown in FIGS. 5-9, to adjust a tension of the biasing member 52. The angle of the brake member 50 is controlled by adjusting the tension of the biasing member 52, thereby controlling how far into the gap between the first and second lower channels the brake member extends. As shown in FIGS. 5-9, the adjusting member 88 is a threaded fastener 88A passing through the third wall of the housing 80 and having a flange member 88B connected thereto that engages the first end 52A of the biasing member 52. The threaded fastener 88B is threadably rotated with respect to the third wall 86 of the housing 80 to adjust the tension of the biasing member 52. The second end 52B of the biasing member 52 receives the cylindrical member 72B of the projection 72 such that the second end 52B of the biasing member 52 abuts the flange member 72A of the projection 72.

As shown in FIGS. 2-4, the first brake assembly 38 is connected to the first lower channel 22. Fastener holes 42D in the upper leg 42A of the first bracket 42 and fastener holes 44D in the upper leg 44A of the second bracket 44 can be used to connect the first and second brackets 42 and 44 to the first lower channel 22. The first brake assembly 40 can then be rigidly connected to the first lower channel 22 by any suitable method, such as welding, if desired, to further secure the first brake assembly 38 to the first lower channel 22.

As shown in FIGS. 2-4, 10 and 11, the second brake assembly 40 is substantially similar to the first brake assembly 38 except disposed as a mirror image thereof on the second lower channel 24. The second brake assembly 40 includes a second brake member 90 pivotally connected to the fourth bracket 48. The second brake member pivots about a second pivot axis A2, which is disposed outwardly of the fourth bracket 48. The second brake member 90 pivots about the second pivot axis A2 that passes through a second fastener, or pivot pin, 112. The second pivot axis A2 is disposed between the third and fourth brackets 46 and 48 in a travel direction of the chain 16. The first and second lower channels 22 and 24 are disposed between the first and second pivot axes A1 and A2 in a direction perpendicular to the travel direction of the chain 16 (FIG. 1) when the first and second brake assemblies 38 and 40 are mounted to the first and second lower channels 22 and 24. The second pivot axis A2 is preferably substantially parallel to the first pivot axis A1.

A second support member 92 extends between the third and fourth brackets 46 and 48, as shown in FIGS. 2-4. A second biasing member 94 is movably disposed in a second housing 96 connected to the second support member 92. Similarly to the first housing 80, the second housing 96 has a fourth wall 98 and a fifth wall 100 extending outwardly from the second support member 92. A second cutout portion 98A is disposed in the fourth wall 98 to facilitate accessing the second biasing member 94 and the second brake member 90. The second cutout portion 98A allows the second brake member 90 and the second biasing member 94 to be easily removed when necessary for maintenance or replacement. The fourth wall 98 of the second housing 96 is closer to the second pivot axis A2 then the fifth wall 100. In other words, a distance between the third wall 98 and the second pivot axis A2 is less than a distance between the fifth wall 100 and the second pivot axis A2.

A second pivot hub 102 is substantially similar to the first pivot hub 64. The second pivot axis A2 passes through a second upper hub member 104 and a second lower hub member 106. The second brake member 90 is pivotally connected to the fourth bracket 48 such that the second brake member 90 is configured to pivot between the second upper hub member 104 and the second lower hub member 106.

The second brake member 90 is substantially similar to the first brake member 50. The second brake member 90 has a second projection 108 extending outwardly from the second brake member 90 to engage the second biasing member 94. The second projection 108 and the second pivot axis A2 are disposed at opposite ends of the same side of the second brake member 90. A second adjusting member 110 is rotatably connected to the second housing 96 to adjust the tension of the second biasing member 94.

The first biasing member 52 is configured to bias the first brake member 50 toward the second lower channel 24. The second biasing member 94 is configured to bias the second brake member 90 toward the first lower channel 22. As shown in FIGS. 2-4, 10 and 11, the first and second biasing members 52 and 94 bias the first and second brake members 38 and 40 toward each other, thereby forming a gap G3 between the first and second brake members 52 and 94 of the first and second assemblies 38 and 40. The first and second adjusting members 88 and 110 can be used to control the gap G3 between the first and second brake members 50 and 90. By controlling the gap G3 between the first and second brake members 50 and 90, the amount of contact between the trolley 18 engaging edges of the first and second brake members 50 and 90 and the trolley 18 can be controlled, thereby controlling the amount of force applied to the trolley 18 as the trolley 18 passes between the first and second brake members 50 and 90. As shown in FIG. 11, a trolley 18 is movably connected to the chain (FIG. 1) to move between the lower channels 22 and 24 of the conveyor system 10. The trolley 18 engages the trolley engaging edges of the first and second brake members 50 and 90, as shown in FIGS. 11 and 12, thereby slowing the trolley 18 to facilitate maintaining contact between the trolley 18 and the pusher. The trolley 18 has a width W greater than the gap G3 between the first and second brake members, such that the trolley 18 pivots the first and second brake members 50 and 90 outwardly against the force applied by the first and second biasing members 52 and 94. After the trolley 18 passes through the first and second brake assemblies 38 and 40, the first and second biasing members 52 and 94 return the first and second brake members 50 and 90 to the rest positions shown in FIG. 11.

The first and second brake assemblies 38 and 40 facilitate maintaining proper positioning of the trolley. Preferably, the first and second brake assemblies 38 and 40 facilitate maintaining contact between the pusher and the retractable dog, which is disposed in front of the pusher in the direction of travel. The first and second brake assemblies 38 and 40 can be disposed at any desirable location along the first and second lower channels 22 and 24 of the conveyor system 10, and preferably are disposed before an incline or decline on the first and second lower channels 22 and 24 of the conveyor system 10 in the direction of travel of the chain 16.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the brake assembly for the conveyor system. Accordingly, these terms, as utilized to describe the present invention should be interpreted relative to a vehicle equipped with the brake assembly for the conveyor system.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A brake assembly for a conveyor system, comprising:
a first bracket configured to receive a channel of the conveyor system;
a second bracket spaced from the first bracket and configured to receive the channel of the conveyor system;
a brake member pivotally connected to the second bracket, a pivot axis about which the brake member is configured to pivot is disposed outwardly of the second bracket;
a biasing member configured to bias the brake member inwardly; and
a support member extending between the first bracket and the second bracket.

2. The brake assembly according to claim 1, wherein the biasing member is movably disposed in a housing connected to the support member.

3. The brake assembly according to claim 2, wherein the housing has a first wall and a second wall extending outwardly from the support member, a cutout portion being disposed in the first wall.

4. A brake assembly for a conveyor system, comprising:
a first bracket configured to be disposed on a first side of a channel of the conveyor system;

a second bracket spaced from and connected to the first bracket and configured to be disposed on the first side of the channel of the conveyor system;

a brake member pivotally connected to the second bracket, a pivot axis about which the brake member is configured to pivot is disposed outwardly of the second bracket; and a biasing member configured to bias the brake member inwardly.

5. The brake assembly according to claim 3, wherein the first wall of the housing is closer to the pivot axis then the second wall.

6. The brake assembly according to claim 4, wherein a boss is connected to the brake member through which the pivot axis passes, the boss being thicker than the brake member.

7. The brake assembly according to claim 6, wherein the pivot axis passes through a pivot hub having an upper hub member and a lower hub member between which the brake member is configured to pivot, the pivot hub being connected to the second bracket.

8. The brake assembly according to claim 7, wherein the boss is received between the upper and lower hub members of the pivot hub.

9. The brake assembly according to claim 4, wherein the brake member is made of steel.

10. A conveyor system, comprising:
an upper channel;
a chain movably connected to the upper channel;
a first lower channel;
a second lower channel disposed opposite the first lower channel; and
a first brake assembly connected to the first lower channel, the first brake assembly including
  a first bracket connected to the first lower channel;
  a second bracket connected to the first lower channel, the second bracket being spaced from the first bracket in a direction of travel of the chain;
  a first brake member pivotally connected to the second bracket, a first pivot axis about which the first brake member is configured to pivot is disposed outwardly of the second bracket; and
  a first biasing member configured to bias the first brake member toward the second lower channel.

11. The conveyor system according to claim 10, wherein a second brake assembly connected to the second lower channel, the second brake assembly being disposed opposite the first brake assembly, the second brake assembly including
a third bracket connected to the second lower channel;
a fourth bracket connected to the second lower channel, the fourth bracket being spaced from the second bracket in the direction of travel of the chain;
a second brake member pivotally connected to the fourth bracket, a second pivot axis about which the second brake member is configured to pivot is disposed outwardly of the fourth bracket; and a second biasing member configured to bias the second brake member toward the first lower channel.

12. The conveyor system according to claim 11, wherein the first and second brake assemblies are disposed before an incline or a decline in the first and second lower channels in the direction of travel of the chain.

13. The conveyor system according to claim 11, wherein a first support member extends between the first bracket and the second bracket; and
a second support member extends between the third bracket and the fourth bracket.

14. The brake assembly according to claim 13, wherein the first biasing member is movably disposed in a first housing connected to the first support member; and
the second biasing member is movably disposed in a second housing connected to the second support member.

15. The conveyor system according to claim 14, wherein the first housing has a first wall and a second wall extending outwardly from the first support member, a first cutout portion being disposed in the first wall; and
the second housing has a third wall and a fourth wall extending outwardly from the second support member, a second cutout portion being disposed in the third wall.

16. The conveyor system according to claim 15, wherein the first wall of the first housing is closer to the first pivot axis then the second wall; and
the third wall of the second housing is closer to the second pivot axis then the fourth wall.

17. The conveyor system according to claim 11, wherein a first boss is connected to the first brake member through which the first pivot axis passes, the first boss being thicker than the first brake member; and
a second boss is connected to the second brake member through which the second pivot axis passes, the second boss being thicker than the second brake member.

18. The conveyor system according to claim 17, wherein the first pivot axis passes through a first pivot hub having a first upper hub member and a first lower hub member between which the first brake member is configured to pivot; and
the second pivot axis passes through a second pivot hub having a second upper hub member and a second lower hub member between which the second brake member is configured to pivot.

19. The conveyor system according to claim 18, wherein the first boss is received between the first upper and lower hub members of the first pivot hub; and
the second boss is received between the second upper and lower hub members of the second pivot hub.

20. The conveyor system according to claim 18, wherein the first and second lower channels are disposed between the first and second pivot axes in a direction perpendicular to the travel direction of the chain.

* * * * *